United States Patent [19]

Pihlaja

[11] 3,851,696

[45] Dec. 3, 1974

[54] TIRE REMOVER

[76] Inventor: Eino Pihlaja, 101 Machar Ave., Thunder Bay P, Ontario, Canada

[22] Filed: June 12, 1973

[21] Appl. No.: 369,257

[52] U.S. Cl.................. 157/1.2, 157/1.26, 157/1.33
[51] Int. Cl. ........................................... B60c 25/08
[58] Field of Search.................... 157/1.2, 1.26, 1.33

[56] References Cited
UNITED STATES PATENTS 2,479,432    8/1949    Tillotson ............................. 157/1.2

FOREIGN PATENTS OR APPLICATIONS 778,079    7/1957    Great Britain ....................... 157/1.2
141,630    7/1949    Australia.............................. 157/1.2

Primary Examiner—Al Lawrence Smith
Assistant Examiner—Harold P. Smith, Jr.
Attorney, Agent, or Firm—Donnelly, Maky, Renner & Otto

[57] ABSTRACT

Apparatus for removing a truck tire from a rim of the type having an integral flange at one end and a removable flange and lock ring at the other end characterized in the provision of a hydraulically actuated lifting member which engages said one end of the rim to lift the rim and tire from a supporting table to engage the removable flange thereof with the lower ends of a circumferentially spaced apart series of curved arms having downwardly and inwardly inclined lower ends thus to raise the lock ring end of the rim with respect to the removable flange and with respect to the top bead of the tire for removal of the lock ring whereupon, by lowering of the lifting member, and consequent disengagement of the removable flange from the lower ends of the curved arms, said flange may be removed from the rim. The curved arms aforesaid are radially adjustable so that when the tire and rim are inverted, the lower ends of the arms may be wedged between the integral flange of the rim and the adjacent tire bead whereupon actuation of the lifting member will raise the rim with respect to the arms and tire thus to strip the rim from the tire for lateral removal of the rim from the lifting member and between said arms followed by lowering of the lifting member and movement of the lower ends of said arms along outwardly and upwardly inclined paths following generally the inclination of the sidewall of the tire for lateral removal of the tire from the supporting table.

1 Claim, 5 Drawing Figures

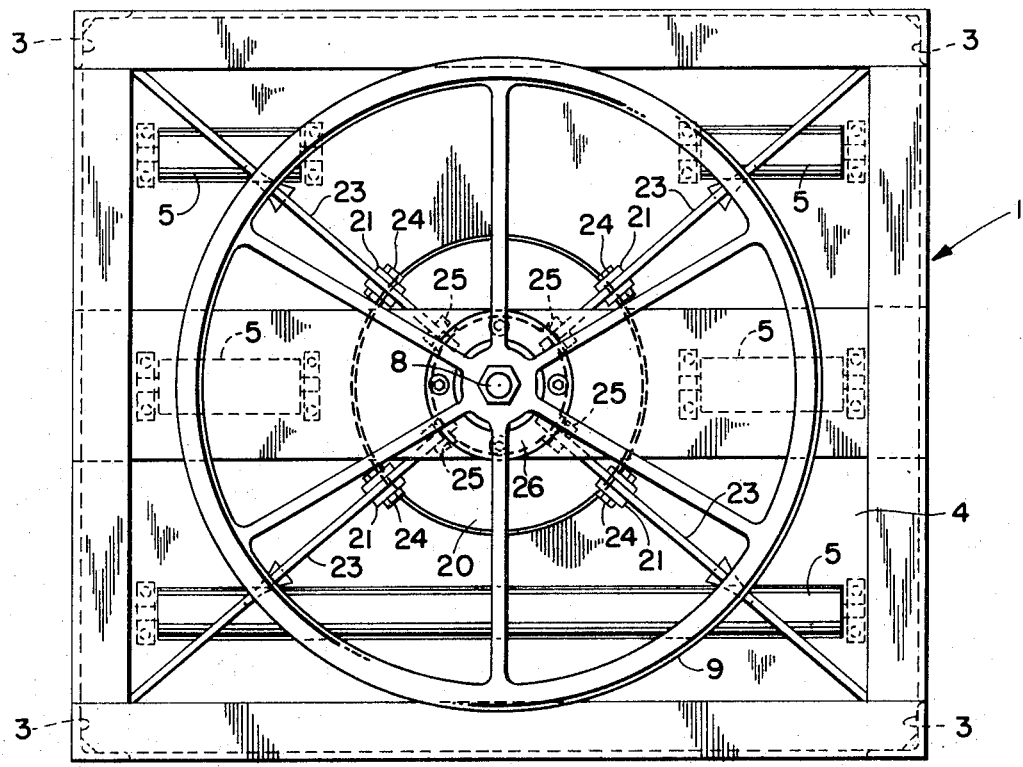
Fig. 2
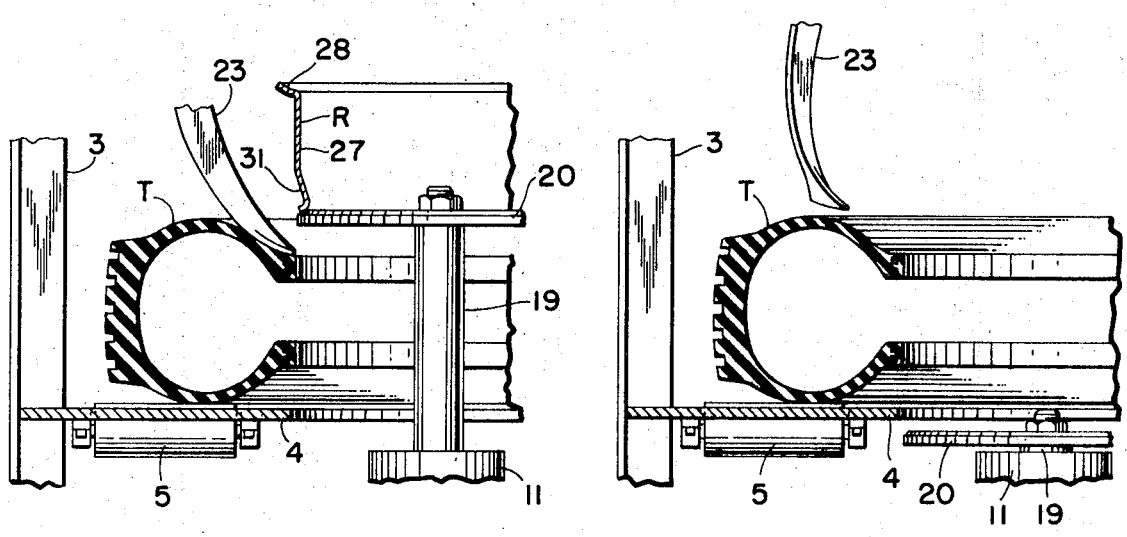
Fig. 4
Fig. 5

TIRE REMOVER

BACKGROUND OF THE INVENTION

By and large, truck tires are being removed from their rims manually by the use of a hammer and tire irons which is heavy and tiring work and may result in bending of the rim flanges and damage to the tire especially in the area of the beads thereof and adjacent sidewall portions.

Various forms of apparatus have been designed for removal of truck tires from their rims but in such known apparatus the tire beads are displaced from the rim flanges by pressure applied on the sidewall portions of the tire radially outward of the rim flanges again with possible injury to the tires. Moreover, while such apparatus may break the tire beads from the flanges and adjacent portions of the rim there yet remains the problem of completely stripping the rim from the tire because the beads are yet in tight engagement with the rim even though the beads may have been broken loose adjacent the rim flanges.

SUMMARY OF THE INVENTION

In contradistinction to known apparatuses, the present invention provides a tire remover in which rim is first raised with respect to the removable flange which is engaged by the lower ends of curved arms depending from a superstructure of the apparatus thus to enable removal of the lock ring from the ring followed by lowering of the rim and tire whereupon the removable flange may be removed from the rim. Thereafter, the tire and the rim without the removable flange and lock ring is inverted followed by lifting of the rim above the tire to completely strip both beads from the rim by pressure applied by the curved arms on the top bead, the arms having been adjusted to be wedged between the integral flange of the rim and the top bead so as to apply pressure on the tire bead itself rather than at zones radially outward of the top bead as in the case of known apparatuses. When the rim has thus been completely stripped from the tire, it may be laterally removed from the lifting member through the space between the curved arms whereupon the lifting member may be lowered through the tire. Finally, after radial outward movement of the curved arms along an outwardly and upwardly inclined path corresponding generally with the inclination of the upper side wall of the tire, the tire may be laterally removed from the apparatus.

It is a principal object of this invention to provide apparatus of the character indicated in which the rim lifting member is hydraulically actuated and in which the curve arms are pivotally mounted on a superstructure of the apparatus and are simultaneously adjusted to move their lower ends radially inwardly and outwardly along inclined paths by screw and nut means.

Other objects and advantages will appear from the ensuing description.

BRIEF DESCRIPTION OF THE DRAWING

FIG. 2 is a top plan view of the apparatus as viewed from the top of FIG. 1;

FIG. 4 is a fragmentary cross-section view showing the stripping of the rim from the tire after inversion of the tire and rim from the FIGS. 1 and 3 position by wedging of the bead engaging arms of the apparatus between the integral flange of the rim and the adjacent bead, and when the apparatus is in the FIG. 4 position, the rim may be laterally removed from the lifting member and between the curved arms; and FIG. 5 is a fragmentary cross-section view showing the lifting member in its lowered position and the curved arms swung outwardly to clear the top sidewall of the tire for removal of the tire from the apparatus.

DETAILED DESCRIPTION OF A PREFERRED EMBODIMENT

Figure 1:
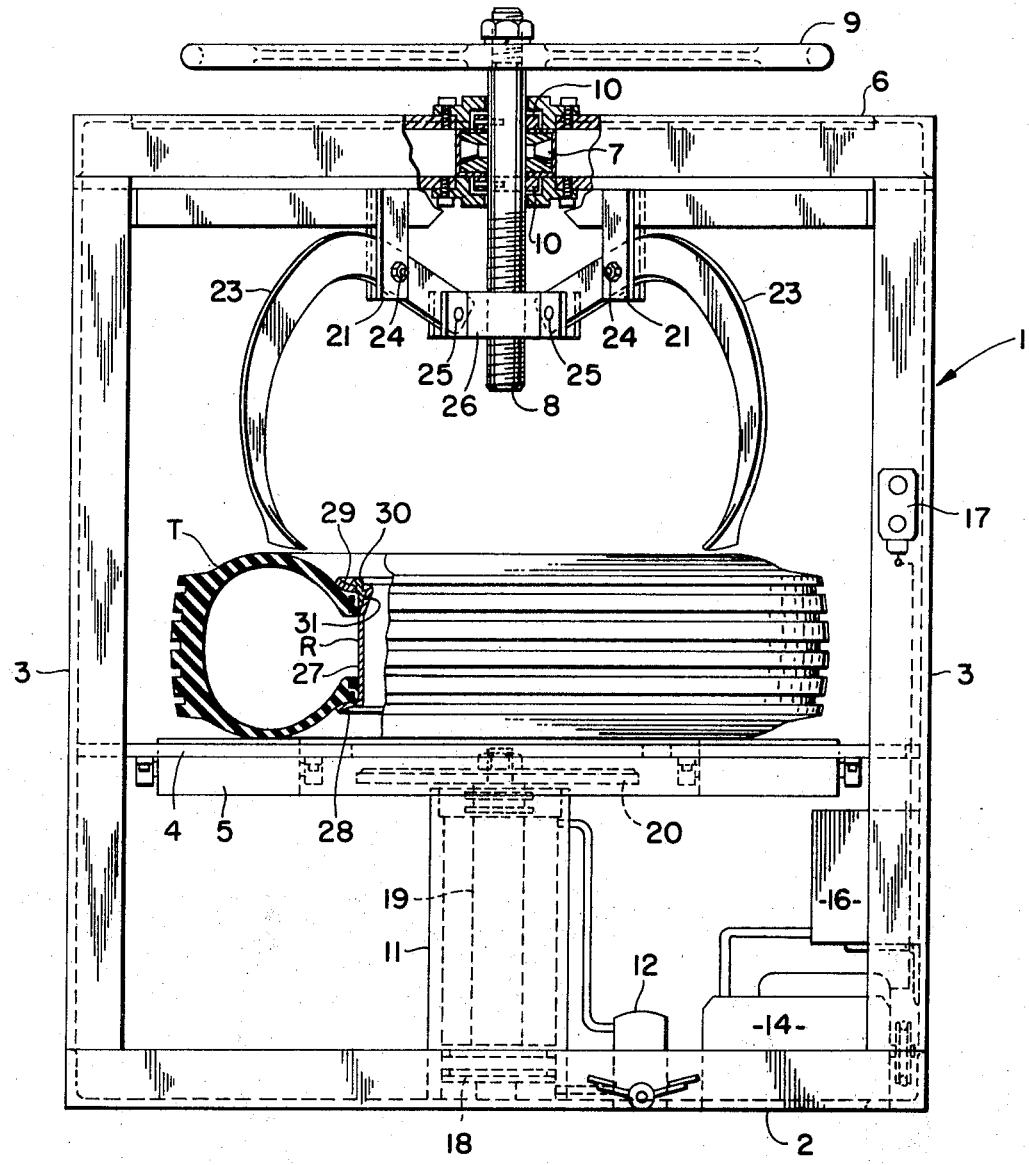
FIG. 1 is a front elevation view of a preferred form of apparatus according to the invention, a portion of the truck tire and rim being shown in cross-section.

The apparatus 1 herein comprises a welded steel framework providing a base 2 having uprights 3 to which are secured a tire support table 4 equipped with rollers 5 to facilitate the insertion of a tire T and rim R assembly and removal of the tire T after stripping of the rim R therefrom, and an upper head 6 having a thrust bearing 7 for a screw 8 which is rotated by a hand wheel 9, said screw 8 being held against axial movement of collars 10 thereon.

The base 2 has secured thereon a hydraulic piston-cylinder assembly 11, a foot-operated four-way reversing valve 12, a pump 14 driven by electric motor 15, and a reservoir or tank 16, one of the uprights 3 having secured thereto a switch 17 for controlling the pump drive motor 15. The tank 16, pump 14, valve 12, and cylinder 11 will be operatively connected together by conduits in well-known manner so that the piston 18 may be raised or lowered in the cylinder 11 or retained in any actuated position when the four-way valve 12 is in neutral position.

The piston rod 19 has connected thereto a lifting member or plate 20 which is movable upwardly and downwardly through a central opening in the tire supporting table 4 for engagement with or disengagement from a truck tire rim R as hereinafter explained in detail.

The upper head 6 has depending brackets 21 to which the upper end portions of curved arms 23 are pivotally connected as the pivots 24 and the radially inwardly extending upper portions of said arms 23 are loosely pivotally connected at 25 to a nut 26 having threaded engagement with said screw 8. The lower ends of said arms 23 are relatively thin and flared out as shown to converge inwardly and downwardly and by reason of the location of the pivots 24 the rotation of the hand wheel 9 and screw 8 results in upward or downward movement of the nut 26 which causes the lower ends of the curved arms 23 to move in an inclined path which generally corresponds to the inclination of the sidewall of the tire T so that when the arms 23 are adjusted as shown in FIGS. 1 and 2 a tire T and rim R assembly may be laterally inserted onto the table 4 in engagement with the rollers 5 thereof with the rim R centered with respect to the lifting member 20.

By way of illustrative example, the truck tire T is of conventional construction having dual cores within its beads and the rim R likewise is of conventional construction having a cylindrical body portion 27 with an integral flange 28 adjacent one bead of the tire T and a removable flange 29 and lock ring 30 at the other end thereof with the removable flange 29 disposed adjacent the other bead of the tire T.

Figure 3:
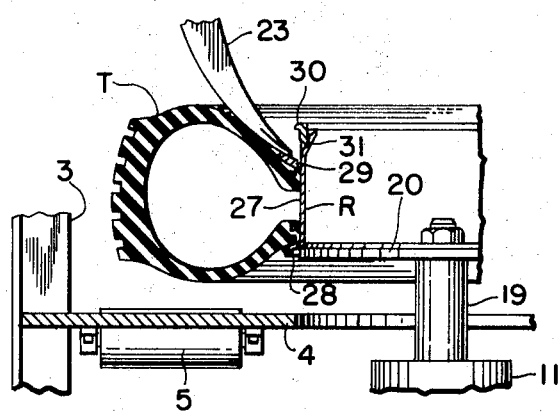
FIG. 3 is a fragmentary cross-section view illustrating the raising of the rim with respect to the removable flange and top bead of the tire to provide access to the lock ring for removing the same.

In the operation of the apparatus 1 herein, the tire T and rim R assembly is placed on the table 4 as shown in FIG. 1 whereupon the screw 8 is turned by the hand wheel 9 to cause the lower ends of the curved arms 23 to move radially inward to a position above the removable flange 29. The operator then operates the four-way valve 12 to cause the piston 18, piston rod 19, and lifting member 20 to move upwardly with consequent movement of the lifting member 20 into engagement with the lower end of the rim R. Since the removal flange 29 and adjacent top bead engaged therewith are restrained against upward movement by the lower ends of the curved arms 23 the lifting of the rim R as shown in FIG. 3 will free the top bead from the upper end of the rim and the lock ring 30 will be exposed for removal from the rim groove 31 as by the use of a screwdriver or like tool. The lifting member 20 may be then lowered by operation of the four-way valve 12 with the tire T and rim R supported by the table 4. In the lowered position of the tire T the removable flange 29 may be removed from the rim R and the arms 23 may be adjusted slightly radially outwardly if desired and, in most cases, the top bead will remain in the FIG. 3 position even if the arms 23 are swung out to the FIG. 1 position.

After the lock ring 30 and flange 29 have been removed and after the lifting member 20 has been lowered to the FIG. 2 position the tire T and rim R are turned upside down and placed on the table 4. At that time, the arms 23 may be adjusted radially inwardly to a diameter slightly larger than the diameter of the integral flange 28 whereupon the lifting member 20 is actuated upwardly to engage the end of the rim R which has the lock ring groove 31 therein and when the integral flange 28 is just above the lower ends of the arms 23, the screw 8 may be turned by the hand wheel 9 to wedge the lower ends of the arms 28 between the integral flange 28 and the adjacent tire bead. With the lower ends of the arms 28 thus wedged under the integral flange 28, the upward movement of the lifting member 20 may be continued to completely strip both of the tire beads from the rim R as shown in FIG. 4. In the FIG. 4 position of the apparatus 1 the rim R may be laterally removed from the lifting member 20 and between the curved portions of the arms 23. With the rim R removed from the apparatus 1 the four-way valve 12 is actuated to lower the lifting member 20 to the FIG. 5 position and the hand wheel 9 is operated to swing the lower ends of the arms 23 to a position clearing the upper sidewall of the tire T whereupon the tire T may be laterally pushed off the table 4. I is noted that in swinging the lower ends of the arms 23 outwardly they describe a path which conforms generally to the inclination of the upper sidewall so as not to entail distortion or possible damage to the tire T.

The embodiments of the invention in which an exclusive property or privilege is claimed are defined as follows:

1. Apparatus for removing a truck tire from a rim having a fixed flange at one end adjacent one tire bead and a removable lock ring and flange at the other end adjacent the other tire bead, said apparatus comprising horizontal support means on which a tire and rim assembly is adapted to be supported with said lock ring and flange uppermost; a hydraulically actuated lifting member adapted when actuated upwardly through an opening in said support means to engage the lower end of said rim; an overhead support structure having a series of circumferentially spaced apart downwardly and inwardly curved arms pivotally connected to said structure for movement of the lower ends thereof radially inwardly and outwardly along inclined paths corresponding generally with the inclination of the bead and adjacent sidewall portions of the tire; means on said structure for pivoting said arms to a position whereat the lower ends thereof overlie said removable flange whereby, upon upward actuation of said lifting member and rim engaged thereby, said lock ring is raised with respect to said removable flange and the top bead engaged with said flange to expose said lock ring for removal from said rim and for removal of said removable flange upon subsequent lowering of said lifting member; said tire and said rim without said locking ring and removable flange being adapted to be inverted on said support means for lifting of the rim and tire to a position whereat the integral flange is in the region of the lower ends of said arms so that said arms may be actuated inwardly to wedge the lower ends thereof between said integral flange and the adjacent tire bead whereupon continued upward movement of the rim by said lifting member strips the rim from both beads of the tire, the space between successive arms enabling lateral removal of said rim from the apparatus; said lifting member, when subsequently lowered, passing through the beads of the tire supported by said support means and when said arms are swung outwardly to positions above the sidewall of the tire, said tire resting on said support means may be laterally removed from the apparatus; said arms having radially inwardly extending upper ends; and said means for pivoting said arms comprising an axially fixed screw rotatable in said structure, and a nut having screw-threaded engagement with said screw and a loose pivotal connection with said upper ends of said arms about pivots radially inward of the pivotal connections of said arms to said structure.

* * * * *